(12) United States Patent
Hintermeister

(10) Patent No.: US 10,841,188 B2
(45) Date of Patent: Nov. 17, 2020

(54) DATA TAGGING FOR SERVICE PROVIDER USAGE ALLOCATION

(71) Applicant: International Business Machines Corporation, Armonk, NY (US)

(72) Inventor: Gregory R. Hintermeister, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 74 days.

(21) Appl. No.: 16/363,670

(22) Filed: Mar. 25, 2019

(65) Prior Publication Data
US 2020/0313987 A1 Oct. 1, 2020

(51) Int. Cl.
H04L 12/26 (2006.01)
(52) U.S. Cl.
CPC ............ H04L 43/065 (2013.01); H04L 43/04 (2013.01)
(58) Field of Classification Search
CPC ....... H04L 43/065; H04L 43/04; H04L 41/22; H04L 63/1433; H04L 9/0637; H04L 2209/38; G06F 16/2365; G06F 16/2379; G06F 21/577; G06F 2221/034; G06F 2221/2101; G06F 9/54
See application file for complete search history.

(56) References Cited

U.S. PATENT DOCUMENTS

| 7,340,436 | B1 | 3/2008 | Lilge |
| 7,401,152 | B2 | 7/2008 | Traversat et al. |
| 8,862,516 | B2 | 10/2014 | Fan et al. |
| 8,971,841 | B2 | 3/2015 | Menezes et al. |
| 9,264,556 | B2 | 2/2016 | Zalmanovitch et al. |
| 9,740,757 | B1* | 8/2017 | Gilder ................... G06F 16/254 |
| 2006/0247944 | A1* | 11/2006 | Calusinski, Jr. ....... G06Q 40/00 705/1.1 |
| 2012/0158947 | A1 | 6/2012 | Hassan et al. |
| 2016/0267082 | A1* | 9/2016 | Wong .................... G06F 16/164 |

(Continued)

OTHER PUBLICATIONS

Anonymous, "Cost Reports for Azure," Retrieved from https://support.cloudcheckr.com/azure-reports/cost-reports-for-azure/, 1 pg., 2018.

(Continued)

Primary Examiner — Todd L Barker
(74) Attorney, Agent, or Firm — Mark Bergner

(57) ABSTRACT

A computer-implemented method includes processing a tagged data unit (TDU) by reading a metadata tag of a received TDU and determining whether the TDU is an excluded TDU or an included TDU. An included TDU is a TDU that is to be included in usage summary information contained in a usage receiver (UR) record. An excluded TDU is a TDU that is not to be included in the usage summary information. Responsive to determining that the TDU is an included TDU, the method includes the information related to the TDU into the usage summary information. Responsive to determining that the TDU is an excluded TDU, the method excludes the information related to the excluded TDU from the usage summary information. Reportable usage summary information is generated from information in the UR record, and, once a reporting criterion is met, the reportable usage summary information is transmitted to the UR.

18 Claims, 8 Drawing Sheets

(56) References Cited

U.S. PATENT DOCUMENTS

2017/0006135 A1* 1/2017 Siebel .................. G06F 9/5072
2019/0132350 A1* 5/2019 Smith .................... H04L 41/22

OTHER PUBLICATIONS

Anonymous, "TrueSight Cloud Cost Control," Retrieved from https://www.bmc.com/it-solutions/cloud-cost-control.html?cid=ps-PaidSearch_MultiCloud_Cost_CloudCostPage_Google-CK-05-wp-01112018&cc=ps&adch=ggl&adcat=mltcldpa&gclid=Cj0KCQjwjvXeBRDDARIsAC38TP6JqIBqs5_8dYZInEtOWkbF9lvCOMunD6QCxVBc6rX1BDIQjmhIXYgaAmaLEALw_wcB, 5 pgs., 2018.

Anonymous, "View Your Cost Trends With Billing Reports," Google Cloud. Retrieved from https://cloud.google.com/billing/docs/how-to/reports, 7 pgs, 2018.

Eludiora et al., "A User Identity Management Protocol for Cloud Computing Paradigm," Int. J. Communications, Network and System Sciences, 2011, 4, pp. 152-163. Retrieved from http://www.SciRP.org/journal/ijcns, 2011.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

DATA TAGGING FOR SERVICE PROVIDER USAGE ALLOCATION

BACKGROUND

Disclosed herein is a data tagging system for managing network utilization in a network services provider.

Organizations commonly use network data processing systems in manufacturing products, performing services, internal activities, and other suitable operations. Some organizations use network data processing systems in which the hardware and software are owned and maintained by the organization. These types of network data processing systems may take the form of local area networks, wide area networks, and other suitable forms, but they also place the burden of maintaining and managing the resources on the organization.

In some cases, an organization may outsource the maintenance of a network data processing system. Other organizations may use network data processing systems in which the hardware and software may be located and maintained by a third party. With this type of organization, the organization uses computer systems to access the network data processing system. With this type of architecture, the organization has less hardware to use and maintain.

Providing accurate metrics for data usage, which correspond to the resources of a network service provider used in processing the data, is an important part of operating the network so that an appropriate allocation of resources to support the network is made.

SUMMARY

According to one or more embodiments, a computer system is provided for processing a tagged data unit (TDU), the system comprising a processor configured to execute instructions that, when executed on the processor, cause the processor to read a metadata tag of a received TDU. The processor determines whether the TDU is an excluded TDU or an included TDU. An included TDU is a TDU that is to be included in usage summary information contained in a usage receiver (UR) record. An excluded TDU is a TDU that is not to be included in the usage summary information. Responsive to determining that the TDU is an included TDU, the processor includes the information related to the TDU into the usage summary information. Responsive to determining that the TDU is an excluded TDU, the processor excludes the information related to the excluded TDU from the usage summary information. The processor generates reportable usage summary information from information in the UR record. After determining that a reporting criterion has been met and responsive to meeting the reporting criterion, the processor transmits the reportable usage summary information to the UR.

According to one or more embodiments, a data tagging engine is provided for creating a tagged data unit (TDU). The data tagging engine comprises a processor configured to execute instructions that, when run on the processor, cause the processor to receive an untagged data unit from an application component, and add a metadata tag to the untagged data unit to produce the TDU. This TDU is communicated between an authorized end user device (AEUD) and an application service provider (ASP) via a network services provider (NSP). The metadata tag includes a usage receiver (UR) identifier that is used to identify a UR that is to receive usage summary information associated with a transmission of the TDU, and transmit the generated usage summary information to the UR based on a reporting criterion.

According to one or more embodiments, a computer-implemented method is provided for processing a tagged data unit (TDU), the method comprising, using a processor, reading a metadata tag of a received TDU. The method further comprises determining whether the TDU is an excluded TDU or an included TDU. An included TDU is a TDU that is to be included in usage summary information contained in a usage receiver (UR) record. An excluded TDU is a TDU that is not to be included in the usage summary information. Responsive to determining that the TDU is an included TDU, the method includes the information related to the TDU into the usage summary information. Responsive to determining that the TDU is an excluded TDU, the method excludes the information related to the excluded TDU from the usage summary information. The method generates reportable usage summary information from information in the UR record, and determines that a reporting criterion has been met. Responsive to meeting the reporting criterion, the method transmits the reportable usage summary information to the UR.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
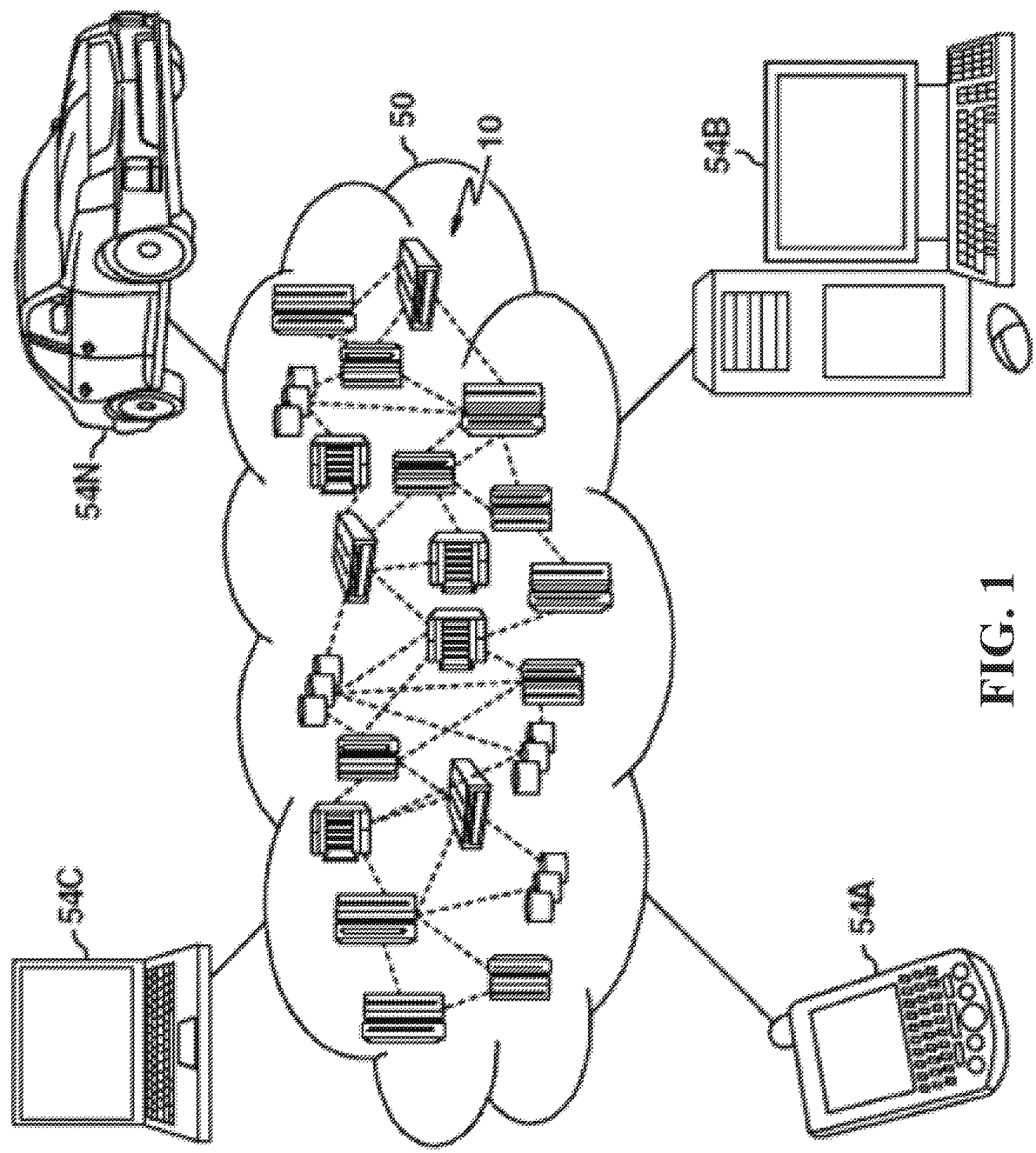
FIG. 1 depicts a cloud computing environment according to an embodiment of the present invention.

One or more embodiments disclosed herein may facilitate the tagging of data that may be used to provide metrics about network resource usage of a network services provider to a usage receiver based on rules or conditions associated with the usage receiver.

| | |
|---|---|
| application service provider (ASP) | An entity that provides access to an application used by an end user. |
| end user | A consumer or producer of data that is produced by or utilized by an application. |
| networked service provider (NSP) | An entity that provides access to an application that is not entirely local to an end-user's device. An NSP may provide networking infrastructure, such as an Internet service provider (ISP), and/or a processing platform infrastructure, such as a cloud services provider, or any other communication service provider. |
| transmitted data unit (TDU) | A measurable unit of data that is transmitted across the network infrastructure of a network service provider. This unit may be a packet of data in a packet-switched network, a frame, a file, a session of streamed data, or any other quantifiable set of data. |

The following definitions are used below:
The following acronyms may be used below:
ADSL asymmetric digital subscriber line
AEUD authorized end user device
ARM advanced RISC machine
ASP application service provider
CD-ROM compact disc ROM
CoD capacity on demand
CPU central processing unit
CUoD capacity upgrade on demand
DPS data processing system
DSLAM digital subscriber line access multiplexer
DSU/CSU data service unit/channel service unit
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LTA logging/tracking/audit
NSP network services provider
PaaS platform as a service
PABX private automatic branch exchange
PDA personal digital assistant
PLA programmable logic arrays
POTS plain old telephone system
PSTN public switched telephone network
RAM random access memory
RISC reduced instruction set computer
ROM read-only memory
SaaS software as a service
SLA service level agreement
SRAM static random access memory
TDU tagged data unit
UR usage receiver
WAN wide-area network
Cloud Computing It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
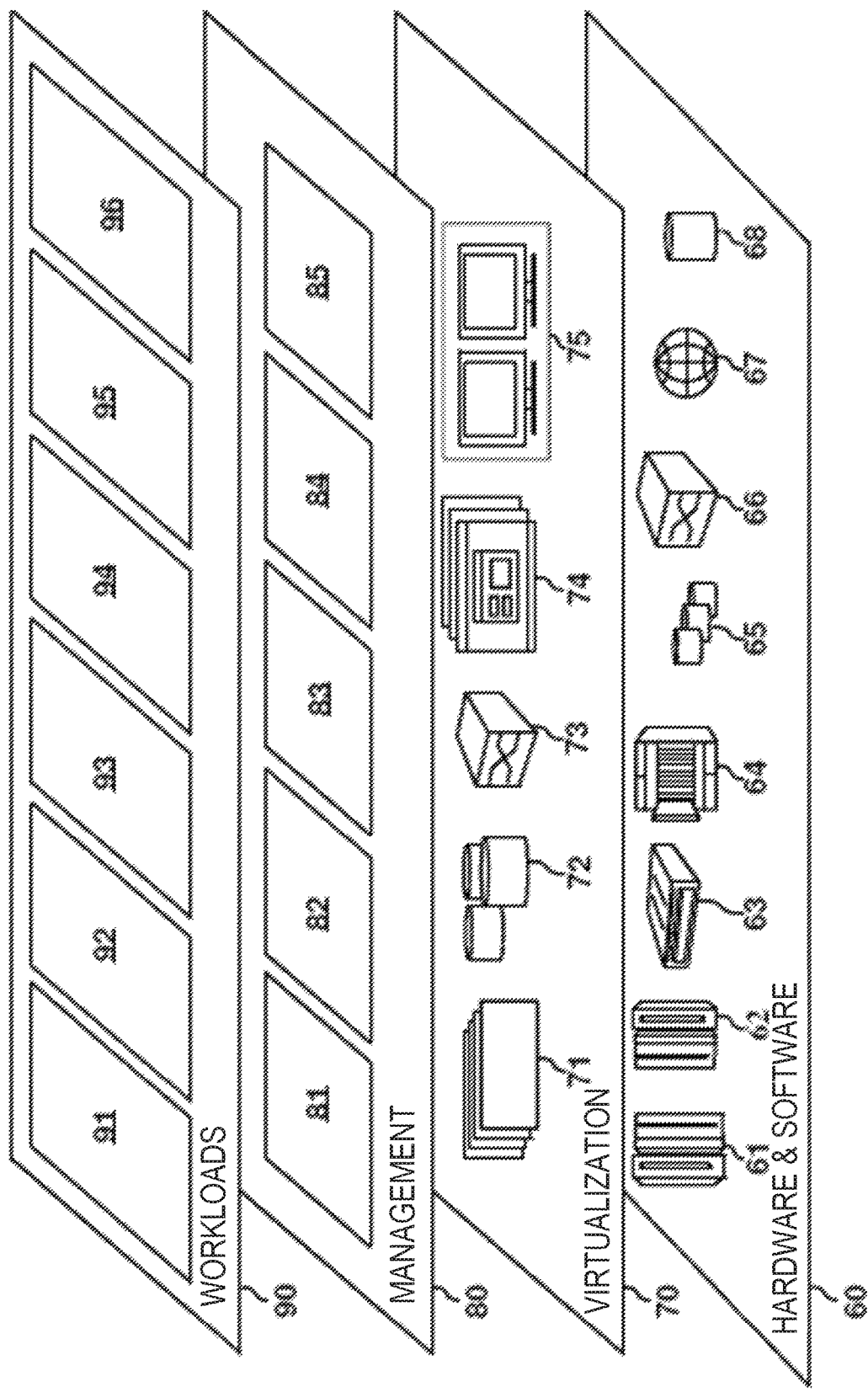
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

Data Processing System

Figure 3:
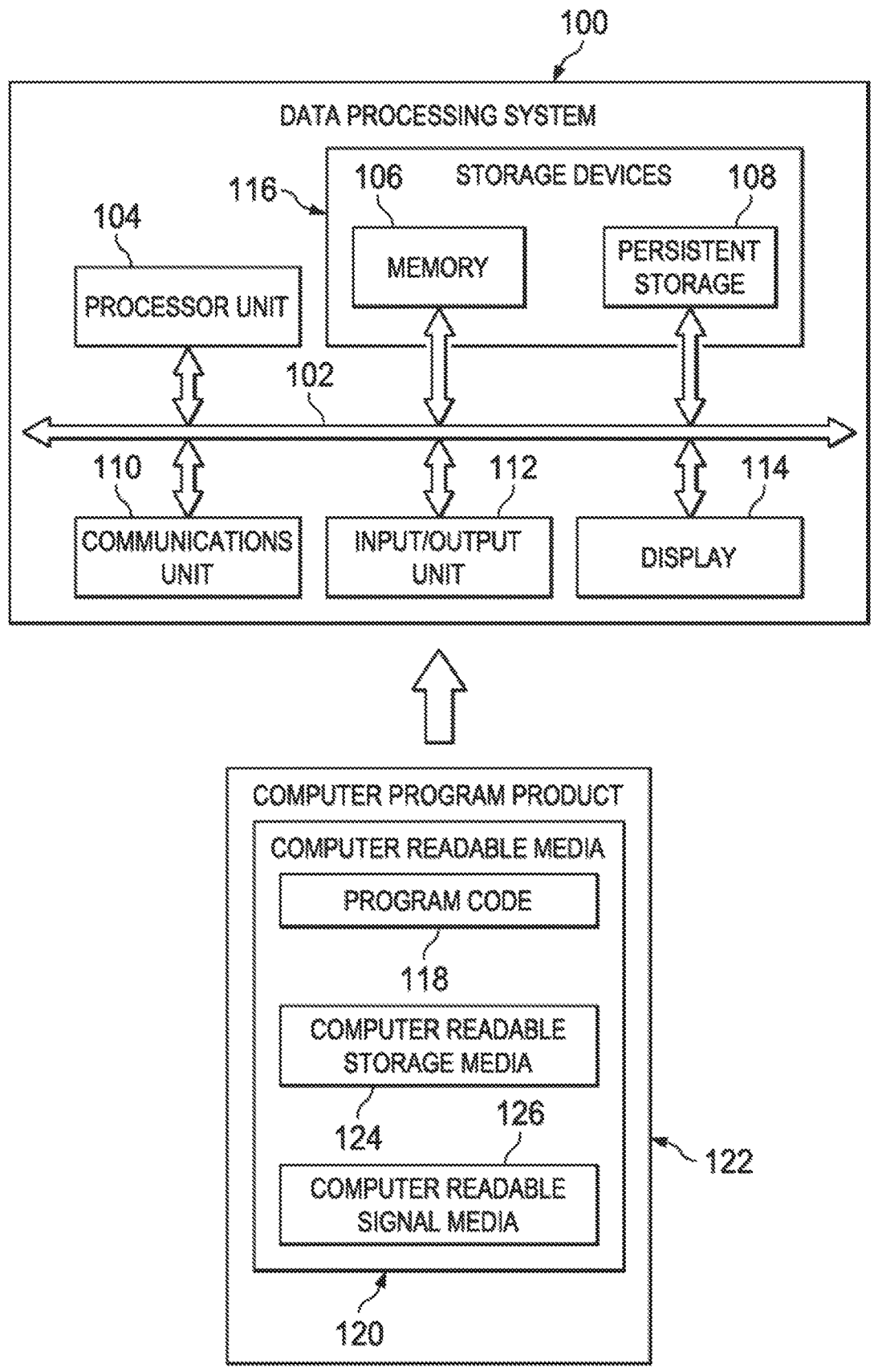
FIG. 3 is a block diagram of a data processing system (DPS) according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random-access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 114 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1 may be varied from the illustrative examples shown.

Although this disclosure includes a detailed description on cloud computing, implementation of the teachings recited herein is not limited to a cloud computing environment. Rather, embodiments are capable of being implemented in conjunction with any other type of computing environment now known or later developed.

Related to a cloud environment or a cloud service provider is the network service provider (NSP). An NSP is a company that may own, operate, and sell access to internet backbone infrastructure and services. The primary customers of NSPs are other service providers, including internet service providers (ISPs), which, in turn, sell internet access to businesses and consumers. ISPs offer online access with a variety of technologies, speeds, and prices through, e.g., a digital subscriber line (DSL), copper, fixed wireless, cable Internet, fiber-optic services, and mobile broadband. End-user customers are typically billed by the NSP and/or ISP according to some combination of transmitted/received data as well as quality of service (QoS).

In a cloud environment, inbound and outbound data and costs associated with the network infrastructure resources of the NSP used is often recovered from the application user. However, sometimes, a different entity than the application user may be the proper entity to recover data usage costs from, or to provide a metric associated with data usage to. A method and system to tag data packets with information identifying the entity that information associated with the metering of data meeting a certain rule or condition is provided herein. As a result, an application that communicates data using an NSP may label data in a manner that permits a flexible metering of data usage. Cloud providers, who may be viewed as a type of NSP, may also operate as a usage receiver for certain entities. These may include, among other entities, those who are utilizing the NSP, e.g., for humanitarian, non-profit, emergency, and other purposes.

Network-based applications, such as client-server applications or cloud-based service applications, typically make use of a network services provider (NSP), such as an internet service provider (ISP), that is an entity separate from an application service provider (ASP). An NSP will typically offer its services to an end user or ASP and price the service based on various factors, such as bandwidth and quality of service (QoS). A total volume of network data may be utilized by the NSP to determine its infrastructure to handle the needed overall capacity, and a volume of network data per region, end user, or ASP may be determined by the NSP for infrastructure or billing purposes. However, the metering of data by the NSP based on a tag of the data provided to properly allocate network resources has not been done.

In order to properly allocate network resources of an ISP or other NSP used to transmit data from one entity to another and to prevent theft or other misallocation of these resources, it is important to properly identify an entity to which usage will be allocated and metered against. Various systems and methods disclosed herein provide a technical solution to provide a secure, accurate, and otherwise trustworthy mechanism for properly allocating and metering network transmissions over a limited resource network infrastructure.

Network Services Provider

Figure 4:
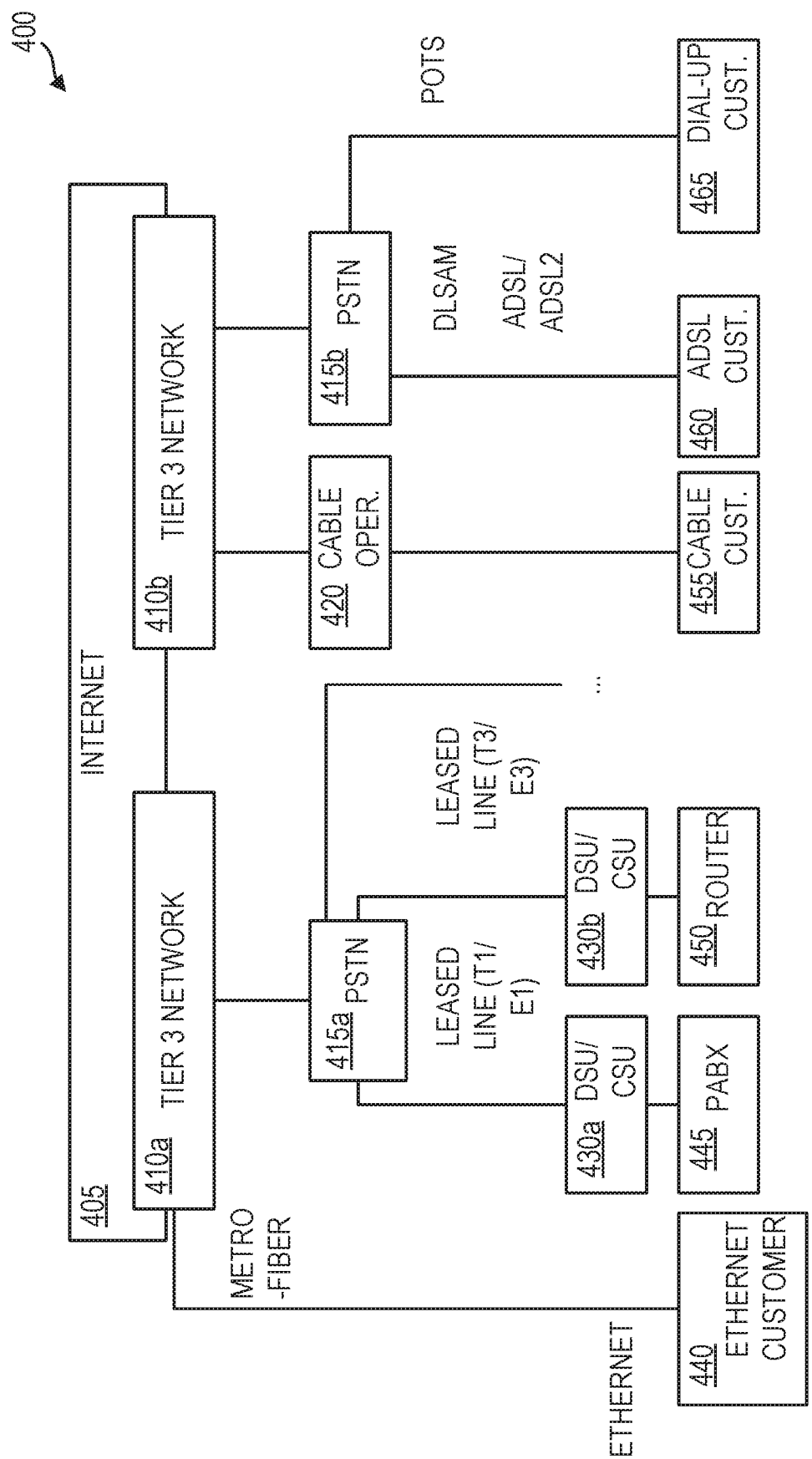
FIG. 4 is a block diagram of an example internet service provider (ISP) system as an example of a network services provider (NSP) system according to one or more embodiments disclosed herein.

FIG. 4 is a block diagram illustrating an example NSP system 400. The example NSP shown is an ISP. An NSP is an entity that provides services for accessing and using a network. For an ISP, such services may include Internet access, Internet transit, domain name registration, web hosting, Usenet service, and colocation, and the ISP may be classified as a Tier 1, Tier 2, and/or Tier 3 service provider. Tier 1 service providers are the "movers and shakers" of the industry. Tier 1 service providers own networks, which does not purchase transit service from any other network, and therefore peers with every other Tier 1 network to maintain global reachability. They are the biggest providers geographically, but are not always the biggest in terms of the number of customers. Tier 2 service providers provide a network with transit connections, customers, and some peering, but they buy transit services from Tier 1 service providers to reach some portions of the Internet. Tier 3 service providers typically do not have any transit customers nor peering relationships. They generally purchase transit Internet connections from Tier 2 service providers and sometimes from the Tier 1 service providers.

FIG. 4 shows the Internet 405 connecting two Tier 3 networks 410a, 410b that deliver the last mile of Internet access to businesses and residential homes. Tier 3 service providers are presumed to strictly purchase Internet transit. They incorporate in their pricing structure Tier 2 and Tier 1 network services that may be needed to transport the data around the world. A metro fiber is an optic fiber connecting multiple ethernet-based customers 440 in a metropolitan area and provides a high-speed broadband connection.

The NSP may also comprise a PSTN 415a connected to the tier 3 network 410a that may connect to DSU/CSUs 430a, 430b to their users through leased lines (T1/E1, T3/E3). Connection to the end user may be via a PABX 445 or via a router 450. In addition, a tier 3 network 410b may utilize a PSTN 415b for an ADSL customer 460 via a DSLAM for ADSL. Dial-up customers 465 may be connected to the PSTN via POTS. It also may provide a connection to a cable customer 455 who obtains cable services from a cable operator 420.

Tagging System

Figure 5A:
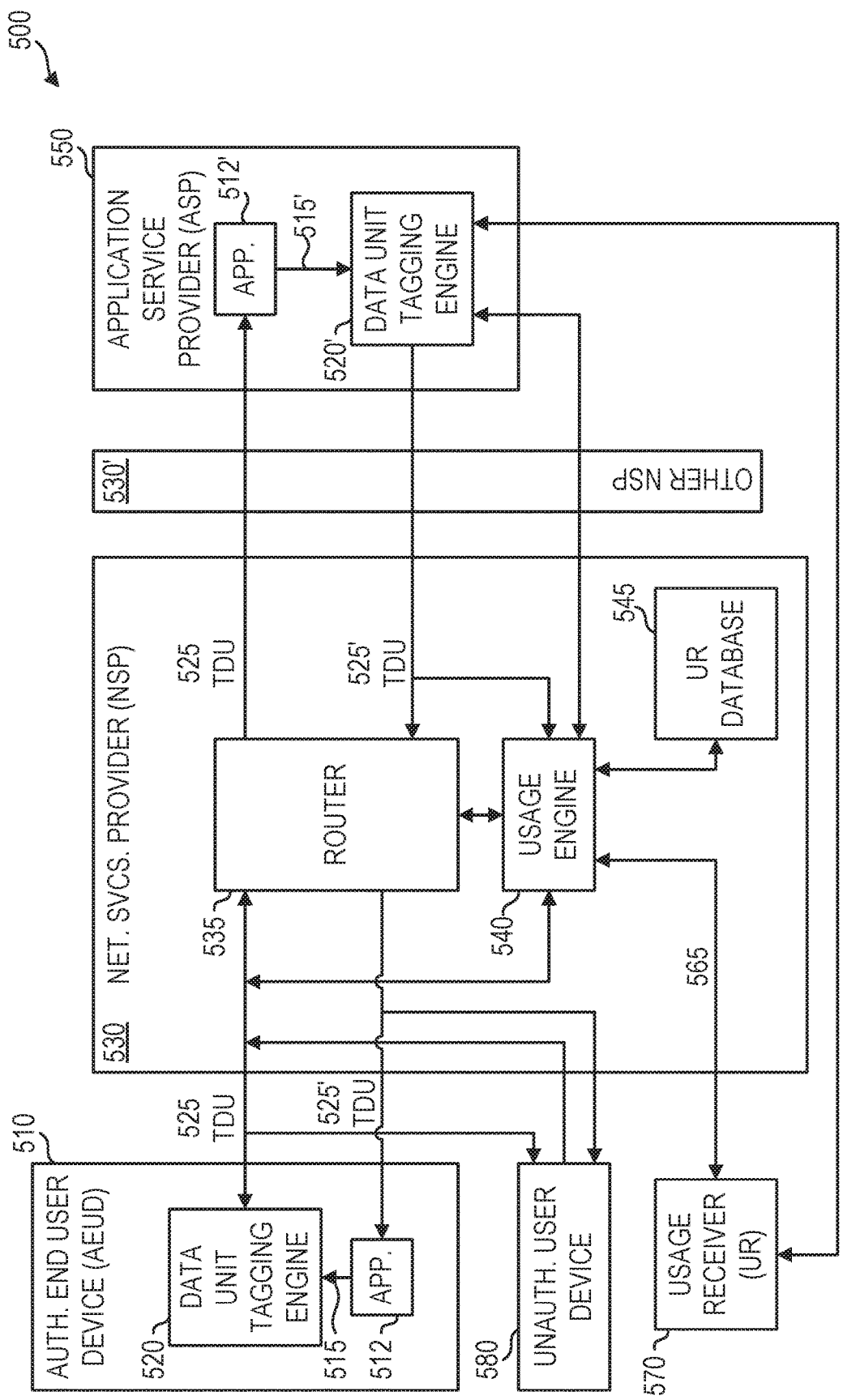
FIG. 5A is a block diagram of a data unit tagging system according to one or more embodiments disclosed herein.

FIG. 5A is a block diagram that illustrates an example tagging system 500 according to one or more embodiments. In an overview, an AEUD 510, which may be a computing device 54A-N and/or a DPS 100, by way of example, described above, may communicate with an ASP 550, which may be a DPS 100, by way of example, via an NSP 530, which may be an NSP 400, by way of example, as described above. The communication may be in a form of one or more TDUs 525, 525' (reference numbers 525 (TDUs originating from the AEUD 510) and 525' (TDUs originating from the ASP 550), may be referred to collectively or by way of example by the single reference character 525 in the following description) containing information relating the TDUs 525 to a UR 570. A usage engine 540 may comprise a processor, for example, the processor 104 described above, that executes software instructions, for example, the program code 118 discussed above, that may determine whether the TDU 525 should send information about the TDU 525 or aggregated information about multiple TDUs 525 to the UR 570. Based on some predefined usage receiver criterion, the usage engine 540 may send the information about the TDU(s) to the UR 570. In general, the AEUD 510 may be authorized to communicate with the NSP 530 as well as be identified in some way by the UR 570. The UR 570 may be an entity that is to receive information related to TDUs 525 that are tagged with information identifying or relating to a particular UR 570.

This example system 500 will be discussed in more detail below, and the following description will utilize one or more use cases to more clearly illustrate various aspects of this example system. For a first use case, the ASP 550 is a service for distributing large-size medical images to an end-user who is a medical practitioner and uses an AEUD 510 that is a personal computer of the medical practitioner. The NSP 530 is the medical practitioner's internet service provider (ISP) that provides internet connectivity. The UR 570 is a hospital for whom the medical practitioner works, but that is independent of the ASP 550 (i.e., it uses the services of the ASP 550, but is not a same entity). The UR 570 desires information about data usage between the AEUD 510 and the ASP 550. Such information may be utilized to allow the hospital (UR 570) to pay the medical practitioner's (end user) ISP (NSP 530) fees for data transmission costs associated with medical images (TDUs 525) transmitted from the medical image service provider (ASP 550) to the medical practitioner's personal computer (AEUD 510) via the ISP (NSP 530), to gauge whether more efficient services are available, to assess the adequacy of equipment that may be used by the medical practitioner, and to determine any number of other technical issues related to data usage via the NSP 530.

Setup/Registration

The UR 570 may initially register with the NSP 530 to: provide the NSP 530 with contact information for the UR 570, obtain access credentials, and provide rules (including conditions) for which usage information for TDUs 525 identifying or associated with the UR 570 is stored. Registration information may be stored by the usage engine 540 in a UR database 545 that resides in a non-volatile memory of or associated with the NSP 530.

Figure 5B:
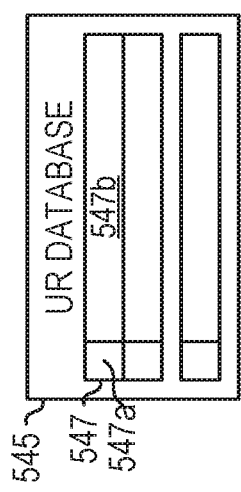
FIG. 5B is a block diagram of a usage receiver (UR) database according to one or more embodiments disclosed herein.

FIG. 5B is a block diagram of an example UR database 545, according to one or more embodiments, containing a plurality of UR records 547, with each record comprising a unique UR identifier 547a, which may be a unique identifier for a particular UR 570 to which usage information may be transmitted, as well as UR data 547b including data associated with the UR 570, the rules, and usage data meeting the rule. The usage engine 540 may receive and register UR registration information in the UR record 547 comprising the UR identifier 547a along with UR data 547b related to the UR. The UR data 547b may comprise the usage summary information (including, e.g., information reflecting a volume of data registered against the UR 570), rules or conditions for including TDU 525 information in the UR record 547, and UR contact or communication information for directing communications to the UR 570.

Figure 5C:
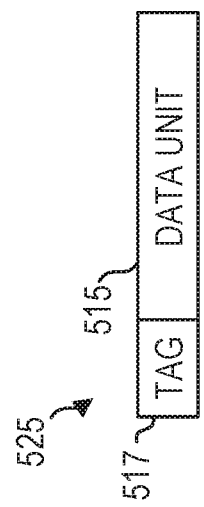
FIG. 5C is a block diagram of a tagged data unit (TDU) according to one or more embodiments disclosed herein.

FIG. 5C is a block diagram of an example TDU 525, according to one or more embodiments. The TDU 525 may comprise a data unit 515 along with its tag 517. The data unit may be any size and may include data at a packet data level in a packet-switched network, or it may include data at a higher level, such as a file of data used in a file transfer protocol (FTP) or a transmittal of an element such as a song or a movie, a bounded segment of a streaming data protocol, or any other size unit. Additional overhead may be incurred if the size of the data unit 515 is greater than a single packet of data, implying that the TDU 525 is broken down into sub-TDUs in order to transmit them via a packet-switched network; in such an implementation the individual packet may not be tagged. The UR registration information may comprise any or all of the rules/conditions, contact/communication information, along with the UR identifier 547*a* or information from which the UR identifier 547*a* may be derived.

The tag 517 may comprise a unique usage receiver identifier that uniquely defines the UR 570, or it may comprise a value that can be mapped to a unique UR identifier. For example, in one implementation, such a value may be an encrypted value that cannot be easily generated by an unauthorized user device 570 or other source. In one implementation, such a value may be created and decoded utilizing known encryption techniques, such as those employing the use of public and private keys.

In the above example use case, the hospital registers with the doctor's ISP (or, in one implementation, with an ISP of the ASP 550) and provides its contact information (e.g., mailing address, phone number, email address, web address, contact name), financial information (e.g., bank account and credit card information), and any other technical information that may be of use. An identifier for uniquely identifying the hospital with the ISP may also be provided. In various embodiments, this may be a unique identifier, such as a 32-bit or 64-bit identifier, that can map back to the hospital.

The hospital may have more than one UR 570 associated with it, and in various embodiments, the UR 570 may be viewed as identifying a set of rules for which usage data is to be aggregated and sent to the contact information associated with the UR 570. For example, the hospital may identify, as an example rule, that aggregate information about TDUs 525 between the medical image service provider and a particular medical professional (e.g., Dr. Jones) are to be collected and reported to the hospital. In this case, the hospital may have a number of UR identifiers (e.g., one for Dr. Jones, one for Dr. Smith, etc.). In another implementation, the hospital may utilize a single UR 570 such that the collection/aggregation rule groups information for a set of medical professionals together. Thus, common usage information may be provided to the hospital for Dr. Jones, Dr. Smith, etc.

The rules themselves for collecting and aggregating usage data may be flexible and include a considerable amount of data. For example, the rules may include information about who the data transmitters and/or receivers are. The transmitter and receiver may be, for example, individual entities (an entity being, e.g., a person or business). In the above use case, the transmitter may be identified as the medical image service provider (X-Rays-R-Us) and a specific end-user (Dr. Jones), meaning that any (legitimate) tagged data unit between X-Rays-R-Us and Dr. Jones is determined to meet the rule by the usage engine 540 and information about it is saved in the UR database 545. In addition to individual entities, sets of entities may be identified. For example, the identifier may be associated with a set of medical professionals and/or a set of service providers. Wildcarding may also be used, for example, to identify a subset of IP addresses.

The rules may utilize location information, to the extent that it may be determinable. For example, all data originating from the medical image service provider (ASP 550) and destined for the country of Ethiopia could be set up as a rule associated with the UR 570 identifier, where the country determination is based on a particular set of IP addresses. The rules may utilize data usage conditions or limitations, such as "any tagged data <500 GB is collected/aggregated/reported". The rules may utilize time information, such as a start and end time for the collection of TDUs. In this way, the UR 570 may temporally limit when such data is collected, aggregated, and reported on. The rules may utilize attribute information relating to an attribute of the data or communication parameters such as quality of service (QoS), etc. Furthermore, the rules may be combinable using Boolean logic so that complex conditions may be created. In a real-world system 500, there may be many AEUDs 510, many ASPs 550, and many URs 570 that are managed by a usage engine 540, and thus, the UR database 545 may contain many UR records 547, one for each UR or entity/rules for the collection, aggregation, and reporting of data usage.

In one implementation, the collection, aggregation, and reporting of data usage may be done for billing purposes. However, the billing for a given amount of data may differ by user. In this situation, metric data 565 reported to the UR 570 may comprise cost-related or billing information (in place of or in addition to the actual data usage information) that may be utilized by the UR 570 to pay the NSP 530 for the data handled by the NSP 530 according to the rules associated with the identifier of the UR 570 (or partially pay for the data, i.e., discount the data costs). In another implementation, account information associated with the AEUD 510 may be provided with the metric data 565 to enable the UR 570 to derive the cost data by making its own calculation of a data cost based on the metric data 565 reported to it.

Registration may also be made by the UR 570 and at least one of the AEUD data unit tagging engine 520 or the ASP data unit tagging engine 520'. In one implementation, the data unit tagging engine 520, 520' receives UR registration information that may comprise tagging instructions or conditions related to the usage UR 570 (that indicate when/how a data unit is to be tagged), as well as UR identification information or information from which the UR identification may be derived. Such information may be provided by the UR 570 and the usage engine 540.

In one further implementation, the UR 570 may provide registration information to the NSP 530 or its usage engine 540 via the data unit tagging engine 520 of the AEUD 510 or through the data unit tagging engine 520' of the ASP 550. In this implementation, at least one of the data unit tagging engines 520, 520' may provide the proper registration along with a verifiable authentication of the UR 570 with the usage engine 540 as an indirect form of registration with the usage engine 540, as long as proper credentials are supplied by the tagging engines 520, 520' that they received from the UR 570.

Operation

Once a UR 570 has registered with the usage engine 540 of the NSP 530, and the relevant information has been stored in the UR record 547 of the UR database 545, it may then be possible to implement a usage or a metering function. The AEUD 510 may have a client-side application component 512, such as a client component of the application, stored on it. The ASP 550 may have a server-side application component 512' stored on it. In a normal configuration that does not utilize the tagging feature, the application component 512 on the AEUD 510 would communicate with the application component 512' on the ASP 550 via the network services provider 530 in a normal (i.e., untagged) manner. In various embodiments disclosed herein, an AEUD data unit tagging engine 520 may be used to tag data units transmitted from the AEUD 510 to the ASP 550, and the ASP data unit tagging engine 520' may be used to tag data units transmitted from the ASP 550 to the AEUD 510. The tagging engine 520, 520' may be implemented as a part of the application 512, 512', as a separate application in communication with the application 512, 512' located in the AEUD 510 and/or the ASP 550, or as a separate application in an entity other than the AEUD 510 or ASP 550.

A data unit may vary in size. In one implementation, the data unit may be a single packet or frame of data communicated in a packet switched network of the NSP 530. In such a scenario, each packet of transmitted data between the components of the application 520, 520' may be provided with a tag. The tag may be placed in, for example, header information of the packet or frame. For example, the IP protocol defines various spare or reserved bits into which the tagging information may be placed. Here, the usage engine 540 may examine each packet (TDU 525, 525') to locate, within the tag, the identifier relating the packet to the UR 570. If the rules/conditions criteria are met, the usage engine 540 may provide information about the data in the data unit into the UR database record 547 data 547b field. Such information may include, e.g., a number of bytes in the packet or payload as an amount of data. In one implementation, the amount of data is aggregated with a previous amount of data so that the usage engine 540 accumulates a total amount of data for the UR 570 meeting the rules/conditions criteria.

The rules or conditions may be implemented in the form of a status determination of the TDU. In a first TDU status determination, the determination is made that the information related to the received TDU is to be included in the usage summary information 547b (the status of the received TDU being an included TDU). In a second TDU status determination, the determination is made that the information related to the received TDU is not to be included in the usage summary information (the status of the received TDU being an excluded TDU). In one implementation, an excluded TDU is only excluded from the usage summary information, yet the TDU is transmitted on to the recipient. However, depending on the rules/conditions criteria, an excluded TDU may be dropped, i.e., not transmitted on to the recipient.

In another implementation, the data unit may be a larger entity, such as a large file or data streamed over a certain period of time. Thus, the data unit may be broken down into a series of sub-units that are then transmitted over the NSP 530. This implementation may require additional intelligence of the usage engine 540, since not every packet of data being routed by the NSP 530 will contain the tagging information. In this instance, a determination may be made that a packet from a plurality of packets of the TDU belongs to the TDU based on a TDU subset criterion. Such a TDU subset criterion may be applied as, for example, the usage engine 540 examining transmissions at a higher level of the protocol, such as looking at the data over an established channel (i.e., a channel established between a source and destination of the TDU prior to transmission of the TDU) between the AEUD 510 and ASP 550. Or it may be able to make inferences that a data packet as a sub-unit belongs to a TDU 525, 525' by examining, e.g., IP addresses of the AEUD 510 and ASP 550 (source and destination of the TDU) in conjunction with a rule (e.g., a duration interval) associated with the UR 570. In various embodiments, the transmitting entity, either the AEUD 510 or the ASP 550, may simply break down any larger data entity into the respective packets and tag each of the packets as the TDU 525, 525'. Since sub-units may still contain the main data unit (TDU) metadata in their headers (e.g., IP address, file name, etc.), an initial sub-unit packet may be tagged, and the usage engine 540 may then let any follow-on sub-unit packet that contains the same IP address, filename, etc. through as a part of the tagging.

One problem to address is how the data unit tagging engines 520, 520' know how to properly tag the data units. In one implementation, the setup information provided to the usage engine 540 by the usage receiver 570 may also be communicated to the data unit tagging engine 520 of the AEUD 510 and/or the data unit tagging engine 520' of the ASP 550. This communication may be performed either directly or via the usage engine 540. In some implementations, it is possible that an initial transmitted data unit(s) (525) may not be tagged. However, once additional information may be ascertained by at least one of the usage engine 540, the AEUD 510, or the ASP 550, such information may be shared and used to determine the proper tagging information and communications continues by using TDUs (525). For example, once the usage engine 540 is able to determine the source and destination IP addresses of a particular packet, it may be able to determine that the communication falls within a condition covered by a UR record 547, and may be able to communicate the tagging information to the data unit tagging engine(s) (520 and/or 520'). In another implementation, the usage engine 540 may actually be able to add the tag to the packet or data unit itself in order to make the data unit tagging engine 520, 520') of the recipient (AEUD 510 or ASP 550) aware of the tagging information to use. A recipient (AEUD 510 or ASP 550) receiving a TDU from a sender (respectively, ASP 550 or AEUD 510) may be able to utilize the received tag information to formulate tags for the responsive data units. Thus, a data unit tagging engine 520, 520' may receive the needed information about how to tag the data unit via at least one of the UR 570 directly, the usage engine 540, or the opposite tagging engine 520', 520.

In one implementation, the UR 570 is the same entity as the ASP 550 or an entity that has the ability to communicate with the ASP 550 so that the data unit tagging engine 520' of the ASP 550 is configured to tag the data (primarily, what tagging identifier to use). In this scenario, additional intelligence may be built into the ASP's data unit tagging engine 520', and the setup information provided to the usage engine 540 by the usage receiver 570 may also be communicated by the UR 570 to the data unit tagging engine 520

In one example use case, the ASP 550 is Netflix®, who also serves as the UR 570, and who wishes to offer a deal to pay for data usage charged by the NSP 530 for anyone wishing to view a documentary video entitled "How to Serve Your Community". A user uses her AEUD 510 to start the Netflix application 512 on her device and request the documentary from the Netflix server, the ASP 550. Rules or other logic within the ASP 550 recognizes the documentary as one that the ASP 550 should be covering the network usage fees for and, if it has not already done so, registers itself as the UR 570 with the usage engine 540 of the AEUD 510 NSP 530. The logic or "Rule" to tag data associated with the particular video, but not others, in this scenario resides in the ASP 550 and does not need to be communicated to the usage engine 540. The ASP 550 may then proceed to transfer the documentary to the AEUD 510 and tag each data unit TDU 525' using its data unit tagging engine 520'.

In one implementation, further rules may be included with the UR 570 registration. In the above use case, if Netflix only wishes to pay network charges for the documentary when viewed in the United States, the UR 570 registration could pass that rule on to the usage engine 540 for storage in the UR database 545. If the usage engine 540 sees tagged data from the ASP 550 to an AEUD 510 that is not located in the United States, it could simply not enter information about that data unit in the UR database record 547, and thus this data would not be metered for this UR identifier.

In another example use case, the ASP 550 is the Kahn Academy®, and the Bill Gates Foundation® (BGF) serves as the UR 570 who is willing to pay the NSP 530 for data usage for any African user (AEUD 510). In this implementation, the BGF may send its registration information to the Kahn Academy, which stores the tagging rules (tag data going to any user who is determined to be located in Africa). The data tagging engine 520' may then register this UR 570 with the usage engine 540 of the African users' NSPs 530 (either at setup or during operation, once it becomes aware that the AEUD 510 belongs to an African user. Although a rule may prevent the tagging engine 520' from tagging data units not bound for Africa, a rule provided to the usage engine 540, passed during a setup between the data unit tagging engine 520' and the usage engine 540 may provide further security in that an erroneously tagged data unit (i.e., one not destined to an African AEUD 510) may not have usage information accumulated into the UR record 547. The setup and registration may be performed with both the NSP 530 of the end-user as well as with the NSP 530' of the ASP 550 such that multiple entities accumulate and report on usage data in the manner described herein back to the BGF as the UR 570.

In one implementation, when a small volume of data is to be sent from one entity to another, and a much larger volume of data is to be sent going the other way, the tagging need only be done for data travelling in the direction containing the much larger volume. Thus, in this use case, the relatively small amount of data for managing the request, control, and termination of the documentary request from the AEUD 510 to the ASP 550 need not be tagged. In the alternative, once the ASP 550 determines that the data may be tagged, may communicate the necessary tagging information to the AEUD 510 (or the data unit tagging engine 520 associated with the application 512) so that data units originating from the AEUD 510 to the ASP 550 may be tagged as well.

As shown in FIG. 5A, the usage engine 540 is located in parallel with a router 535 of the NSP 530 so that the TDUs (525, 525') are received by both the router 535 and the usage engine 540 via a network interface of the NSP 530 configured to receive the TDU. In this configuration, the usage engine 540 may operate relatively independently of the router 535, although it may be possible to provide a communications link between the router 535 and the usage engine 540, as show in FIG. 5A. However, in another embodiment, the usage engine 540 may be located in series with a router 535, or actually form a part of the router 535. In this configuration, the usage engine 540 may be able to serve as a filter—that is, if an invalid identifier is received, the usage engine 540 may discard the packet or take some other form of remedial action in place of or in addition to passing the packet to the router 535 to route the packet to its ultimate destination. In an implementation utilizing a series configuration, a portion of the usage engine 540 may be provided on each side of the router 535 to handle communications originating from either side of the router 535.

Unauthorized User—Improper Tagging

One potential problem in the tagging system 500 is that an unauthorized user device 580 could be used for improper tagging. In a simple scheme, a detected TDU from an unauthorized user device 580 may have its UR identifier in the metadata tag 517 searched and determined to be absent in the UR database 545. This may be a scenario where simply a proper registration has not taken place.

In an example of a more complex unauthorized user device 580 scheme, the unauthorized user device 580 may examine TDUs 525 being sent over the network using, e.g., a network sniffer. The unauthorized user device 580 could potentially then examine the tag 517 and obtain the identifier from the tag 517 used for the UR 570. It could then send its own TDUs 525 using the illicitly obtained tag 517 or identifier contained therein. In a use case example, a user with an unauthorized user device 580 monitors IP data packets being sent across the Internet and captures a packet transferred between Netflix (ASP 550) and a legitimate user watching a movie (AEUD 510). The unauthorized user device 580 examines the tag 517 and obtains the usage receiver 570 identifier, then initiates a large file transfer to another entity, tagging the data unit or packets with the Netflix identifier so that these data units or packets are improperly metered against the Netflix identifier.

In order to prevent this, various security measures may be put in place. In a simple implementation, the rules may simply specify that a particular identifier be used only when the to, the from, or both addresses match a particular criteria, such as individual or groups of IP addresses. This is a simple technique, but may be problematic in that various users, particularly end users, may not have a static IP address, and hence the IP address of the end-user AEUD (510) may change over time. Thus, additional techniques may be utilized to prevent an unauthorized user device 580 from improper tagging and a detection of a TDU from an unauthorized user device 580.

In one implementation, the identifier in the tag 517 may change with each TDU 525 that is sent, so that it is a dynamic identifier. Public-private key encryption techniques may be utilized so that the usage engine 540 may examine the dynamic identifier and determine that the TDU 525 originated from an authorized source, e.g., the AEUD 510 or the ASP 550, and may utilize content data, date and time data, etc. to produce constantly changing hashes that cannot be produced by an unauthorized user device 580. In this scenario, even though the unauthorized user device 580 is able to read the dynamic identifier from a TDU 525, it is of no value, since a proper next TDU 525 will contain a different (and undeterminable, by the unauthorized user device 580) dynamic identifier for the tag 517. Significantly, in this implementation, a plurality of legitimate dynamic identifiers are known only to the AEUD 510, the usage engine 540, and the ASP 550, and not by the unauthorized user device 580. The dynamic identifiers should be mapped, by the usage engine 540, to an identifier of the usage receiver 570 so that proper metering may be performed. The use of a plurality of such dynamic identifiers may be implemented by providing a list of dynamic identifiers to the connected entities (the AEUD 510 or ASP 550), by a mathematical formula utilizing public/private keys of the entities and some changing element in the system (data contents, date/time, pre-defined formula, number list, etc.).

Security may be further implemented using a two-factor authentication. This may be illustrated using the example provided above. When performing the tagging, the BGF, as the UR 570, (when tagging the Kahn Academy video) may be sent a second factor authentication from the Kahn Academy, as the ASP 550 before the TDU 525' is tagged. On the receiving end, the BGF may send a unique code to an end user in Africa, as the AEUD 510, stating "enter this unique code in the next twenty minutes to get free streaming education". The end user, via the AEUD 510, may then enter the unique code, and when the Kahn Academy sees the private/public match to the BGF tag, the Kahn Academy may tag the streaming instance with BGF tag so that BGF is properly metered/charged. This illustrates, among other things, that a third party can work with a content provider to ensure the tags are accurate and secure, while the NSP 530 need only concern itself with tracking tags and does not need to be involved with the two-factor authentication process.

The two-factor authentication process may, in various embodiments, be implemented as a third-party two-factor authorization/authentication for individual files in a common/open data pool in which a library of files could be open to the world (i.e., no password required), but with the caveat that file downloads of such files are limited based on a successful tagging and acceptance of the device based on the criteria described herein.

In various embodiments, blockchain technology may be utilized for "big picture" verification, such as the initial tagging and post reporting of the metering. By way of example, blockchain peers may be the ASP 550 (e.g., Kahn Academy), the NSP 530 (e.g., Verizon), and the third-party (e.g., BGF). In various embodiments, the peers are the only entities involved in the tagging. In the above example, the blockchain ledger tracks "BGF requests to tag KA video #43565". The Kahn Academy recognizes BGF as a trusted peer and confirms the tag of that video, and the Kahn Academy receives a request for the tagged video. A smart contract may be utilized where the Kahn Academy may confirm if this user qualifies for the BGF tag. The Kahn Academy may then add an entry "tagged streaming instance of video #43565 to user x". The NSP may then look at the blockchain to confirm which entity to charge and provide end-of-month summaries by looking up this information for UR database usage.

Reporting

Accumulated metrics, including usage, metering information, or other related information for the TDUs 525 using the UR identifier (or another related identifier, such as the dynamic identifier discussed above) that may be stored in a record 547 of the UR database 545 associated with the UR 570 may be reported/transmitted to the UR 570 in a form of reportable usage summary information; such information may be presented to the UR 570 in any form that includes the accumulated amount of data that has been validly transmitted identifying the UR identifier or information related to the accumulated amount of data. In one implementation, a trigger (or reporting criterion) for the usage engine 540 to report to the UR may be defined as a part of the rules in the UR record 547 and triggers the usage engine to provide the reportable usage summary information to the UR 570. This trigger may be, for example, time based, and occur (possibly periodically) after a predefined amount of time has passed via expiration of a periodic timer, or any sort of time limit or period has been reached. The trigger may be, for example, content-based, occurring once a certain amount of tagged data has been sent, or once an amount of tagged data has been sent that is within some predefined limits. The trigger may be, for example, event-based, such as at the conclusion of the TDU being completely transmitted. The trigger may also be that a report request has been received by the usage engine 540 to provide the report to the UR 570 (which may or may not be the ASP 550). The trigger may be flexible, given that Boolean logic may be used to define simple or complex rules, as described above, and these rules may be utilized for setting up the trigger.

In addition to reporting on a volume of data transferred, in one implementation, the usage engine 540 may access accounting information related to the end user from the NSP 530 about the data service associated with the end user. This may permit a determination of costs associated with the TDU to be determined by the usage engine 540 or UR 570 as well. The usage engine 540 may additionally or alternately communicate such cost information (e.g., dollars) or data related to the cost information (e.g., dollars per megabyte) to the UR 570. Such information may permit and effective determination as to how best to allocate technical resources used in the communications.

In one implementation, the usage engine 540 may take on a more active role than reporting information to the UR 570. It may, possibly in conjunction with and/or in communication with the router 535, serve to control communications. As noted above, if the usage engine 540 detects an invalid tag, it may so inform the router 535 and the TDU 525 may be discarded. In another implementation, the TDU 525 is allowed to be routed as if there were no identifying tag. In a further implementation that uses blockchain, the usage engine 540 may communicate usage to the blockchain ledger for the usage/metering.

Processes

Figure 6:
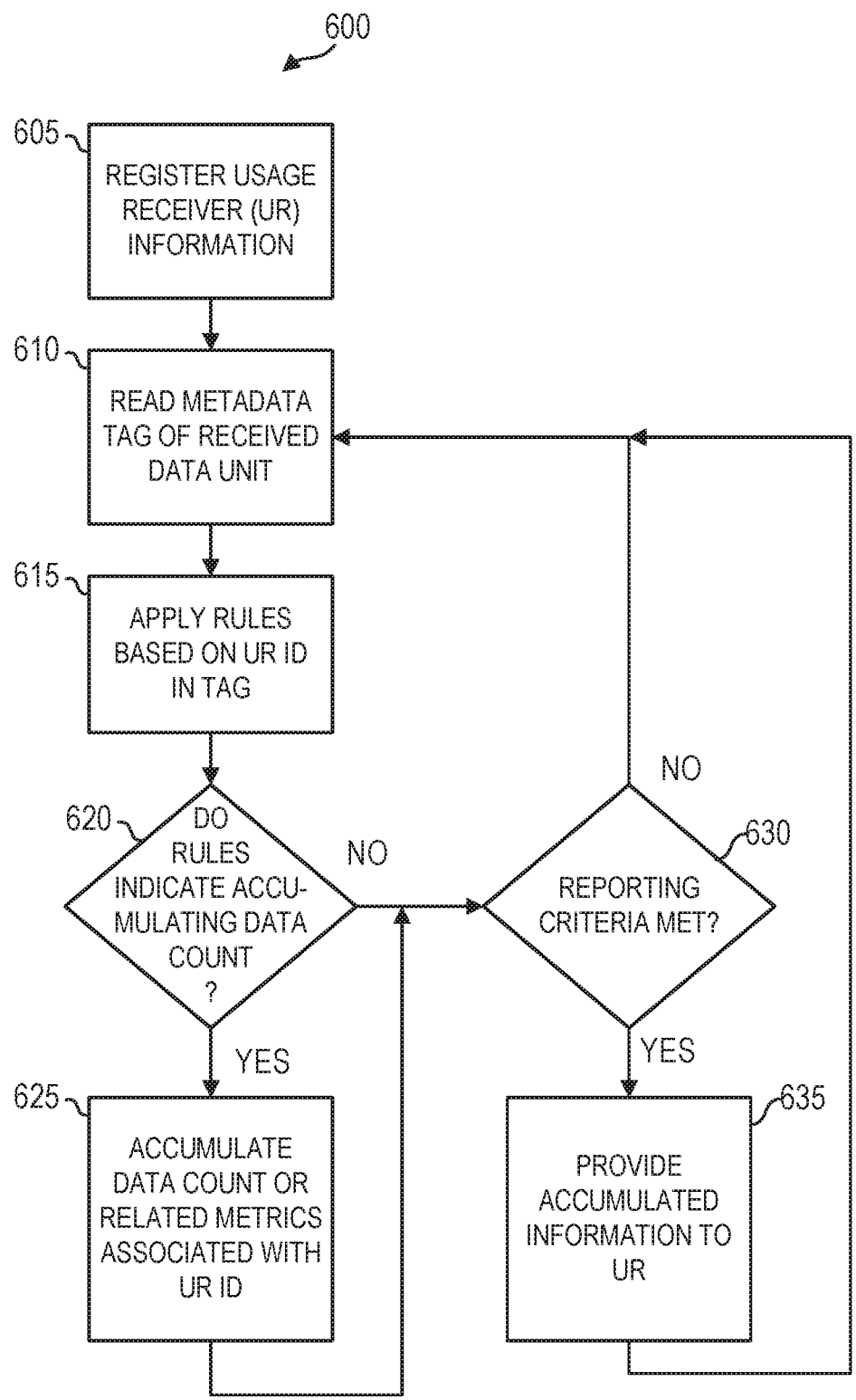
FIG. 6 is a flowchart of an example method for operating a data unit tagging system by an NSP according to one or more embodiments disclosed herein.

FIG. 6 is a flowchart that illustrates an example process 600 for operating a data tagging system by an NSP 530, according to one or more embodiments, that may implement various procedures described herein. The process 600 may be implemented by, for example, the program code 118 stored on the computer readable signal (120) or storage media (124) of a computer program product 122, as described above. In operation 605, the usage receiver 570 may register with the NSP 530. As described above in more detail, an initial registration may be used to obtain access credentials. The initial registration may also be used to provide rules/conditions to store usage information for TDUs 525 identifying (or that is associated with) the UR 570. This registration information may be stored by the usage engine 540 in an UR database 545. In operation 610, a TDU 525 received by the NSP 530 having a metadata tag 517 comprising an identifier or information from which an identifier of the UR 570 may be obtained.

In operation 615, rules associated with the UR 570 that may be stored in record 547 of the UR database 545 may be applied to the TDU 525 in order to determine if information about the TDU 525 data is to be accumulated in the record 547. In operation 620, when the rules indicate accumulating a count and/or related metrics associated with the UR 570 (operation 620: YES), then, in operation 625, the count and/or related metrics are provided or accumulated in the record 547. Otherwise (operation 620: NO), or after performing operation 625, operation continues at operation 630.

In operation 630, a determination is made to see if criteria for reporting the accumulated data has been met. If so (operation 630: YES), then, in operation 635, accumulated information stored in the record 547 may be provided to the UR 570, and, in some implementations, some or all of the accumulated information may be cleared. If the reporting criteria is not met (operation 630: NO), or after performing operation 635, processing may continue at operation 610. Even if no data is accumulated in this pass (operation 620: NO), the reporting criteria may still be met (operation 630: YES), and the information related to the accumulated data up to this point in time (e.g., the current accumulated data count) may be provided to the UR.

Figure 7:
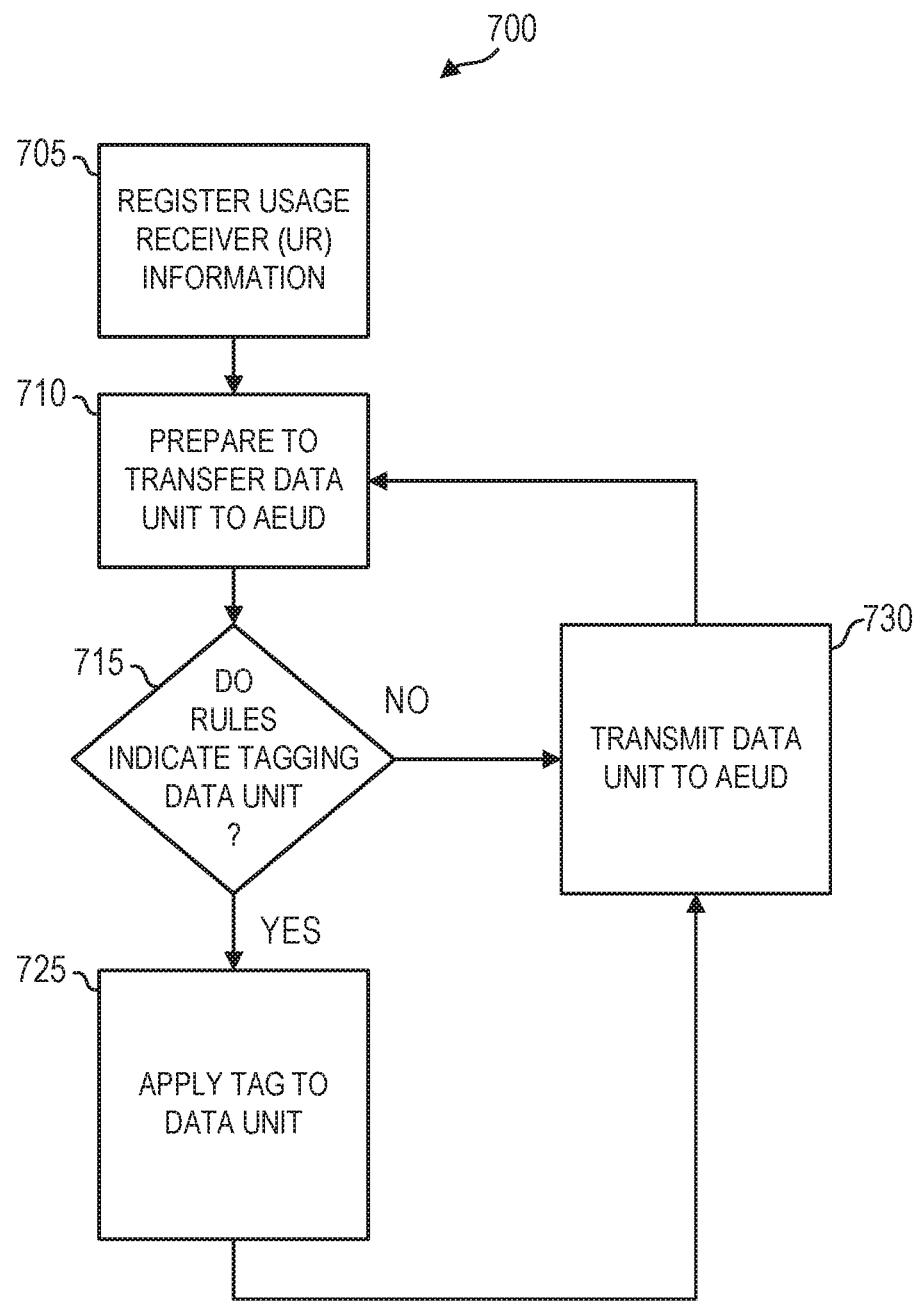
FIG. 7 is a flowchart of an example method for operating a data unit tagging system by an application service provider (ASP) according to one or more embodiments disclosed herein.

FIG. 7 is a flowchart that illustrates an example process 700 for operating a data tagging system by an ASP 550, according to one or more embodiments, that may implement various procedures described herein. In operation 705, the UR 570 may register UR registration information that provides information containing, e.g., the UR unique identifier, contact or communication information related to the UR 570, tagging rules or conditions according to which the data units are to be tagged by the tagging engine 520' of the ASP 550, and possibly other related information. In operation 710, the application component 512' may prepare to transmit an (initially) untagged data unit 515' to a corresponding application component 512 on the AEUD 510 via one or more NSPs 530, 530'. In operation 715, the data unit tagging engine 520' may determine from rules or conditions that were previously provided to it whether to apply a tag 517 to the untagged data unit 515', and if the determination is to tag the data unit (715: YES), the, in operation 725, the tag 517 may be applied to the data unit 515' to produce a TDU 525', which, in operation 730, may be transmitted to the application component 512 on the AEUD 510. If the rules or conditions indicate that the data unit 515' should not be tagged (715: NO), then operation 730 is performed for transmitting the untagged data unit 515' to the application component 512 on the AEUD 510 without tagging it, as would take place in a known manner.

The one or more embodiments disclosed herein accordingly provide an improvement to computer technology. For example, a usage determination of network resources may permit a network architecture to be properly configured in order to meet a particular demand by its users. The ability to properly allocate usage to a usage receiver may allow necessary resource allocations to be applied in a fair and efficient manner.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Table of Reference Numbers

| | |
|---|---|
| 10 | cloud computing nodes |
| 50 | cloud computing environment |
| 54A | PDA or cellular telephone |
| 54B | desktop computer |
| 54C | laptop computer |
| 54N | automobile computer system |
| 54A-N | computing devices |
| 60 | hardware and software layer |
| 61 | mainframes |
| 62 | RISC architecture-based servers 62 |
| 63 | servers |
| 64 | blade servers |
| 65 | storage devices |
| 66 | networks and networking components |
| 67 | network application server software |
| 68 | database software |
| 70 | virtualization layer |
| 71 | virtual servers |
| 72 | virtual storage |
| 73 | virtual networks |
| 74 | virtual private networks, virtual applications and operating systems |
| 75 | virtual clients |
| 80 | management layer |
| 81 | resource provisioning |
| 82 | metering and pricing |
| 83 | user portal |
| 84 | service level management |
| 85 | SLA planning and fulfillment |
| 90 | workloads layer |
| 91 | mapping and navigation |
| 92 | software development and lifecycle management |
| 93 | virtual classroom education delivery |
| 94 | data analytics processing |

-continued

Table of Reference Numbers

| | |
|---|---|
| 95 | transaction processing |
| 96 | mobile desktops |
| 100 | DPS |
| 102 | communication bus |
| 104 | processor unit |
| 106 | memory |
| 108 | persistent storage |
| 110 | communications unit |
| 112 | I/O unit |
| 114 | display |
| 116 | storage devices |
| 118 | program code |
| 120 | computer readable media |
| 122 | computer program product |
| 124 | computer readable storage media |
| 126 | computer readable signal media |
| 400 | NSP ISP |
| 405 | Internet |
| 410a, b | tier 3 networks |
| 415a, b | PSTN |
| 420 | cable operator |
| 430a, b | DSU/CSU |
| 440 | ethernet-based customers |
| 445 | PABX |
| 450 | router |
| 455 | cable customer |
| 460 | ADSL customer |
| 465 | dial-up customer |
| 500 | tagging system |
| 510 | AEUD |
| 512 | client-side application component |
| 512' | server-side application component |
| 515 | client-side untagged data unit |
| 515' | server-side untagged data unit |
| 517 | tag |
| 520 | data unit tagging engine (client side) |
| 520' | data unit tagging engine (server side) |
| 525, 525' | tagged data unit (TDU) |
| 530 | NSP |
| 530' | other NSP |
| 535 | router |
| 540 | usage engine |
| 545 | UR database |
| 547 | UR database record |
| 547a | UR identifier |
| 547b | UR data |
| 550 | ASP |
| 565 | usage information/metric data |
| 570 | UR |
| 580 | unauthorized user device |
| 600 | process |
| 605-635 | process operations |

What is claimed is:

1. A computer system for processing a tagged data unit (TDU), the system comprising:
    a processor configured to execute instructions that, when executed on the processor, cause the processor to:
    read a metadata tag of a received TDU;
    determine whether the TDU is an excluded TDU or an included TDU, wherein an included TDU is a TDU that is to be included in usage summary information contained in a usage receiver (UR) record, and an excluded TDU is a TDU that is not to be included in the usage summary information;
    responsive to determining that the TDU is an included TDU, include the information related to the TDU into the usage summary information;
    responsive to determining that the TDU is an excluded TDU, exclude the information related to the excluded TDU from the usage summary information;
    generate reportable usage summary information from information in the UR record; and wherein, responsive to the determining that the TDU is an excluded TDU, the instructions further cause the processor to further detect a TDU from an unauthorized user device,
    determine that a reporting criterion has been met; and
        responsive to meeting the reporting criterion, transmit the reportable usage summary information to the UR; and
    wherein the instructions further cause the processor to use a blockchain ledger for verification, and wherein the blockchain ledger tracks requests to tag data associated with blockchain peers utilizing smart contracts.

2. The system of claim 1, wherein the TDU is a packet in a packet switched network.

3. The system of claim 1, further comprising:
    a network interface configured to receive the TDU;
    a usage receiver (UR) database stored in a non-volatile memory of the system, the UR database comprising a plurality of UR records, each UR record comprising a UR identifier that uniquely defines a UR to which to transmit usage information; and
    a usage engine that comprises the processor, wherein the usage engine receives and registers UR registration information in a UR record comprising the UR identifier and UR data related to the UR and receives the received TDU via the network interface.

4. The system of claim 1, wherein the detection of the TDU from the unauthorized user device is performed by further instructions to cause the processor to further search and determine to be absent a unique UR identifier from a unique UR identifier present in the metadata tag or derived from information in the metadata tag.

5. The system of claim 1, wherein the instructions further cause the processor to use a blockchain ledger for verification.

6. The system of claim 1, wherein for only the included TDU, the instructions further cause the processor to transmit the TDU to an entity selected from the group consisting of an authorized end user device (AEUD) and an application service provider ASP.

7. The system of claim 1, wherein:
    the TDU comprises a plurality of packets that are received by the system individually; and
    the instructions further cause the processor to:
    determine that a packet of the plurality of packets belongs to the TDU based on a TDU subset criteria; and
    in response to the determination that the packet belongs to the TDU, include information related to the packet into the usage summary information.

8. The system of claim 7, wherein the TDU subset criteria includes a criteria selected from the group consisting of: a) a source address and a destination address of the packet are a same source address and destination address according to a rule in the UR data; and b) a channel in which the packet is to be transmitted is one that was established between a source and destination of the TDU prior to transmission of the TDU.

9. The system of claim 1, wherein the determination that the reporting criterion has been met comprises a determination selected from the group consisting of: a) a periodic timer has expired, b) the TDU has been completely transmitted, c) a time limit or period has been reached, and d) a report request has been received.

10. The system of claim 1, wherein the UR is an application service provider (ASP).

11. The system of claim 1, wherein the usage summary information is cost-related information.

12. The system of claim 11, wherein the cost-related information includes cost information or information allowing cost information to be derived by the UR.

13. A data tagging engine for creating a tagged data unit (TDU), the data tagging engine comprising a processor configured to execute instructions that, when run on the processor, cause the processor to:
    receive an untagged data unit from an application component;
    add a metadata tag to the untagged data unit to produce the TDU communicated between an authorized end user device (AEUD) and an application service provider (ASP) via a network services provider (NSP), wherein the metadata tag includes a usage receiver (UR) identifier that is used to identify a UR that is to receive usage summary information associated with a transmission of the TDU; and
    wherein the data tagging engine receives usage receiver registration information comprising: tagging instructions related to the UR; and
    information selected from the group consisting of the UR identification and information from which the user registration identifier is derived;
    transmit the generated usage summary information to the UR based on a reporting criterion; and
    wherein a blockchain ledger is utilized for verification, and wherein the blockchain ledger tracks requests to tag data associated with blockchain peers utilizing smart contracts.

14. The data tagging engine of claim 13, wherein the data unit tagging engine is located in at least one of the AEUD or the ASP.

15. The data tagging engine of claim 13, wherein the data tagging engine receives the UR registration information from an entity selected from the group consisting of the UR and a usage engine.

16. The data tagging engine of claim 13, wherein the instructions further cause the processor to use a two-factor authentication process that does not involve the NSP in the two-factor authentication process.

17. A computer-implemented method for processing a tagged data unit (TDU), the method comprising, using a processor:
    reading a metadata tag of a received TDU;
    determining whether the TDU is an excluded TDU or an included TDU, wherein an included TDU is a TDU that is to be included in usage summary information contained in a usage receiver (UR) record, and an excluded TDU is a TDU that is not to be included in the usage summary information;
    responsive to determining that the TDU is an included TDU, including the information related to the TDU into the usage summary information;
    responsive to determining that the TDU is an excluded TDU, excluding the information related to the excluded TDU from the usage summary information;
    generating reportable usage summary information from information in the UR record;
    determining that a reporting criterion has been met; and
    wherein, responsive to the determining that the TDU is an excluded TDU, detecting a TDU from an unauthorized user device,
    determining that a reporting criterion has been met; and
        responsive to meeting the reporting criterion, transmitting the reportable usage summary information to the UR; and using a blockchain ledger for verification, and wherein the blockchain ledger tracks requests to tag data associated with blockchain peers utilizing smart contracts;
responsive to meeting the reporting criterion, transmitting the reportable usage summary information to the UR.

18. The method of claim 17, wherein for only the included TDU, the method further comprises transmitting the TDU to an entity selected from the group consisting of an authorized end user device (AEUD) and an application service provider ASP.

* * * * *